US010104060B2

(12) United States Patent
Datta et al.

(10) Patent No.: US 10,104,060 B2
(45) Date of Patent: Oct. 16, 2018

(54) AUTHENTICATING APPLICATIONS TO A NETWORK SERVICE

(71) Applicant: HEWLETT-PACKARD DEVELOPMENT COMPANY, L.P., Houston, TX (US)

(72) Inventors: Kaushik Datta, Bangalore (IN); Sankarlingam Dandabany, Rancho Cordova, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 833 days.

(21) Appl. No.: 13/754,126

(22) Filed: Jan. 30, 2013

(65) Prior Publication Data
US 2014/0215572 A1 Jul. 31, 2014

(51) Int. Cl.
H04L 29/06 (2006.01)
H04L 9/32 (2006.01)

(52) U.S. Cl.
CPC ........ H04L 63/0823 (2013.01); H04L 9/3263 (2013.01); H04L 63/0227 (2013.01); H04L 63/0428 (2013.01); H04L 63/0807 (2013.01); H04L 63/102 (2013.01)

(58) Field of Classification Search
CPC ... H04L 63/0923; H04L 9/3263; H04L 63/08; H04L 63/0227; H04L 63/102; H04L 63/0807
USPC ..... 726/3, 4, 22–26; 713/154, 156, 168, 175
See application file for complete search history.

(56) References Cited

U.S. PATENT DOCUMENTS

| 5,548,646 | A | * | 8/1996 | Aziz et al. ............... 713/153 |
| 6,182,146 | B1 | | 1/2001 | Graham-Cumming |
| 6,463,474 | B1 | * | 10/2002 | Fuh et al. ............... 709/225 |
| 6,674,764 | B1 | | 1/2004 | Garland et al. |
| 7,222,360 | B1 | | 5/2007 | Miller |
| 7,434,254 | B1 | * | 10/2008 | Foschiano et al. ......... 726/13 |
| 7,962,954 | B2 | | 6/2011 | Zavalkovsky et al. |
| 8,238,357 | B2 | * | 8/2012 | Sonoda .................. 370/401 |
| 8,316,430 | B2 | * | 11/2012 | Mirza-Baig ............... 726/13 |
| 8,433,929 | B2 | * | 4/2013 | Yamashita ............... 713/193 |
| 8,600,355 | B1 | * | 12/2013 | Sadhvani et al. ......... 455/411 |
| 8,677,471 | B2 | * | 3/2014 | Karels et al. ............ 726/11 |
| 8,726,382 | B2 | * | 5/2014 | Knapp et al. ............ 726/23 |
| 8,792,644 | B2 | * | 7/2014 | Goto .................... 380/270 |
| 2001/0027527 | A1 | * | 10/2001 | Khidekel et al. ......... 713/201 |
| 2002/0004901 | A1 | * | 1/2002 | Yip et al. ............... 713/156 |
| 2002/0031230 | A1 | * | 3/2002 | Sweet et al. ............ 380/278 |
| 2003/0114144 | A1 | * | 6/2003 | Minemura ............... 455/410 |
| 2004/0098588 | A1 | * | 5/2004 | Ohba et al. ............. 713/169 |
| 2005/0050317 | A1 | * | 3/2005 | Kramer et al. ........... 713/155 |

(Continued)

OTHER PUBLICATIONS

Jeanquier, S., "An Analysis of Port Knocking and Single Packet Authorization", MSc Thesis, Royal Holloway University of London, Sep. 9, 2006, pp. 1-68.*

(Continued)

Primary Examiner — William S Powers
Assistant Examiner — Tongoc Tran
(74) Attorney, Agent, or Firm — Trop, Pruner & Hu, P.C.

(57) ABSTRACT

Authenticating applications to a network service includes authenticating an application with a certificate to access a service provider over a logical connection between the application and the service provider and confirming that the application is using an authorized port of the service provider.

19 Claims, 6 Drawing Sheets

(56) References Cited

U.S. PATENT DOCUMENTS

| | | | |
|---|---|---|---|
| 2005/0120214 A1* | 6/2005 | Yeates et al. | 713/171 |
| 2005/0125692 A1* | 6/2005 | Cox et al. | 713/201 |
| 2005/0152305 A1* | 7/2005 | Ji et al. | 370/328 |
| 2007/0033644 A1* | 2/2007 | Thomas et al. | 726/10 |
| 2007/0269048 A1* | 11/2007 | Hsu | 380/270 |
| 2008/0109913 A1* | 5/2008 | Sturtevant et al. | 726/32 |
| 2010/0325427 A1* | 12/2010 | Ekberg et al. | 713/156 |
| 2012/0209976 A1 | 8/2012 | Mcquade | |
| 2013/0104200 A1* | 4/2013 | Choi | H04L 63/08 726/4 |

OTHER PUBLICATIONS

Srivastava, V., "Advanced Port Knocking Authentication Scheme with QRC using AES", Department of Cyber Law and Information Security, Indian Institute of Information Technology, Allahabad, India., IEEE 2011, pp. 159-163.*

"802.1x: Port-based Authentication Standard for Network Access Control (NAC)" Sep. 2010 http://www.juniper.net/us/en/local/pdf/whitepapers/2000216-en.pdf.

* cited by examiner

AUTHENTICATING APPLICATIONS TO A NETWORK SERVICE

BACKGROUND

Networks are vulnerable to attacks from malicious users. To reduce or prevent unwanted users from harming a network, a firewall is incorporated into the network to prevent unwanted users from having access to the network. Further, anti-virus programs are also installed onto network components that actively seek out and inhibit malicious users. Such programs can search for anomalies in the network's activity to find suspicious behavior. Once found, the programs quarantine the source of the anomalous behavior to reduce its influence on the networks' components.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Despite the use of firewalls and anti-virus programs, network security is still a significant issue for network operators. A network can authenticate a user before the user can have access to the network when the user inputs a correct password. If the user fails to input the correct password, the user is not authenticated. However, passwords can be deciphered or stolen leaving networks that rely on password authentication vulnerable to malicious attacks.

The principles describe herein include a method for authenticating applications to a network service. Such a method includes authenticating an application with a valid identity certificate to access a service over a logical connection between the application and the service provider and confirming that the application is using an authorized port to access the network service.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
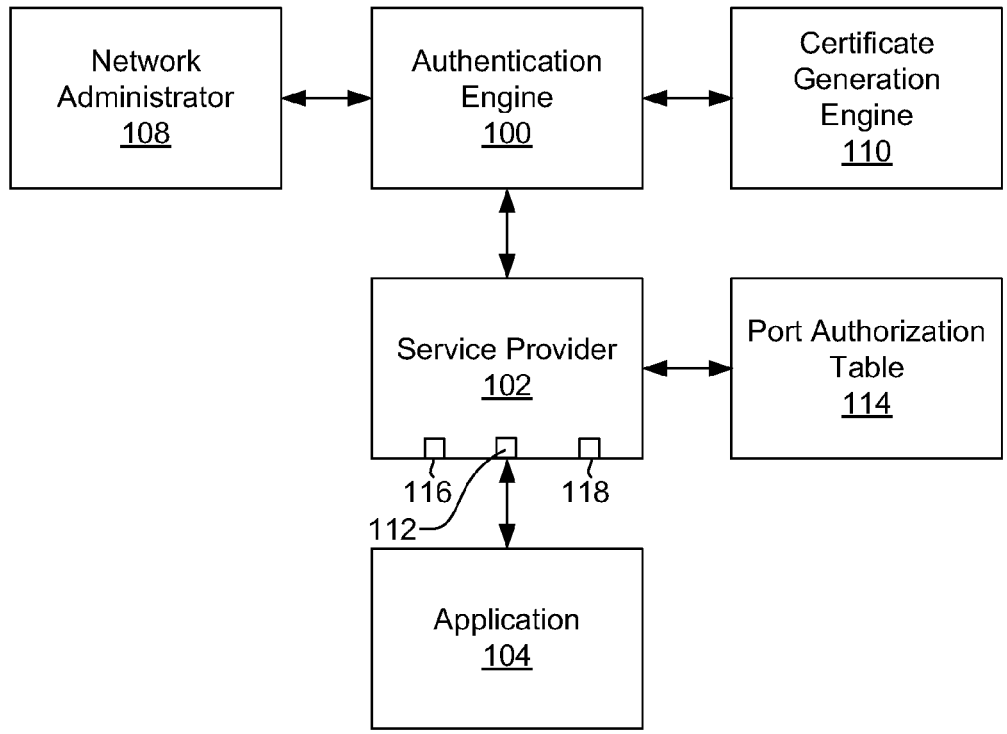
FIG. 1 is a diagram of an example of an authentication engine according to the principles described herein.

FIG. 1 is a diagram of an example of an authentication engine (100) according to the principles described herein. In this example, a service provider (102) is capable of providing at least one service to an application (104) on a network. The application (104) may be administered with a controller, a processor, a computing device, a host, a virtual network component, a physical network component, a microprocessor, another device, or combinations thereof. The service provider (102) may provide a switching service, a computing service, a routing service, storing service, processing service, a compression service, another service, or combinations thereof. In some examples, the application (104) is run with an x86 controller sold by the Intel Corporation, which is headquartered in Santa Clara, Calif., USA, and the service provider (102) is a switch that provides switching services. In other examples, other processors are used in accordance with the principles described herein.

If an application (104) wants to avail itself of the services provided by the service provider (102), the application needs a valid identity certificate. If the application (104) does not have a valid identity certificate, the application (104) sends a signing request to initiate a pre-authentication process with the service provider (102). An authentication engine (100) in the service provider (102) sends the application's request to a network administrator (108) to determine whether the application (104) should be allowed to access the services of the service provider (102).

The network administrator (108) may look at just the request from the application (104). In other examples, the network administrator looks at additional information sent by the application (104), the service provider (102), an external source, another source, or combinations thereof to determine whether the application (104) should be allowed to access the services of the service provider. In a situation where the service provider is a switch or a router, being authorized to access the service provider's services will include receiving access to additional network components behind the router or switch. Thus, the network administrator (108) will carefully consider whether to allow access. The network administrator (108) may base his decision on his own determinations, or the network administrator (108) may base his decision on a decision policy that has established rules for allowing or disallowing an application (104) from having access to a service provider (102) and/or to a network. In other examples, a processing element follows a set of rules from an approval policy to determine whether to approve the application (104) for access to the service provider (102).

If the network administrator (108) denies certificate signing request, the application (104) will not have access to the service provider (102) and/or the network. On the other hand, if the network administrator (108) grants permission to allow the application (104) to have access, the authentication engine (100) uses a certificate engine (110) to sign the identity certificate to send to the application (104). The identity certificate may include instructions about how the application (104) can have access to the service provider's services.

The service provider (102) sends the identity certificate to the application (104), which is stored at the application (104). In response to receiving a packet, the service provider (102) determines whether the application (104) is using the correct port to communicate with the service provider (102). The certificate may indicate with which port the application (104) should communicate with the service provider (102). Regardless of whether the certificate indicates an authorized port (112) for communication between the application (104) and the service provider (102), the service provider (102) tracks which applications are authorized for communication with the service provider (102) over which ports in a port authentication table (114). The port authorization table (114) tracks each unique application specific identifier assigned to each application (104) and the corresponding port that each unique application specific identifier is authorized to communicate with the service provider (102).

The application (104) creates the data connection with the service provider (102) by sending a packet to a port selected by the application (104). In response to receiving the packet, the service provider (102) extracts from the packet the unique application specific identifier assigned to the application (104) when it was issued a certificate. The service provider (102) consults with the port authorization table (114) to determine whether the unique application specific identifier from the packet matches the port in which the data connection is currently established.

If the application is using an incorrect port, the communication will fail. On the other hand, if the application (104) is using the authorized port (112), then the data connection between the application (104) and the service provider (102) is completed.

Each packet sent from the application (104) to the service provider (102) will contain an embedded key, which the service provider (102) extracts in response to receiving the packet. If there is no embedded key, the packet is not processed. Further, if the embedded key is invalid, the packet is also not processed. However, if the packet contains a valid, embedded key, the service provider (102) will process the packet and avail the application (104) of the service provider's services. Thus, the principles described herein enforce a per packet authorization to protect the service provider.

In some examples, the keys from the certificate become outdated. In such examples, the service provider (102) sends the updated keys to the applications (104). No re-authentication procedure is performed in conjunction with receiving the updated keys.

Each of the above described procedures adds a layer of security between the application (104) and the service provider (102). For those examples where the service provider (102) is a switch or a router, each of the procedures adds a layer of protection to the network. For example, the service provider (102) is protected if the administrator denies the application (104) approval to use the service provider's services. Further, the service provider (102) is further protected if the application (104) chooses to not authenticate the service provider (102), thereby preventing any malicious infection from the application (104). Also, the service provider (102) is protected by not processing packets that come into the wrong port due to the port authorization process. Additionally, each packet is scrutinized to ensure that even if the packet somehow appears to be coming from the application (104) that the packet is still coming from an authorized source. Also, the embedded keys become outdated over time, so even if an embedded key mimics an earlier version of the embedded key, malicious users can still be identified and stopped before the packets are processed.

To add an additional layer of protection, all of the communications between the application (104) and the service provider (102) occur over encrypted connections. The encrypted connections even apply while the data connection between the application (104) and the service provider (102) are still in a provisional state during the authorization process. Such a security model for data transmission can be used with any appropriate network service infrastructure, including cloud based network service infrastructure, other network service infrastructure, or combinations thereof.

Figure 2:
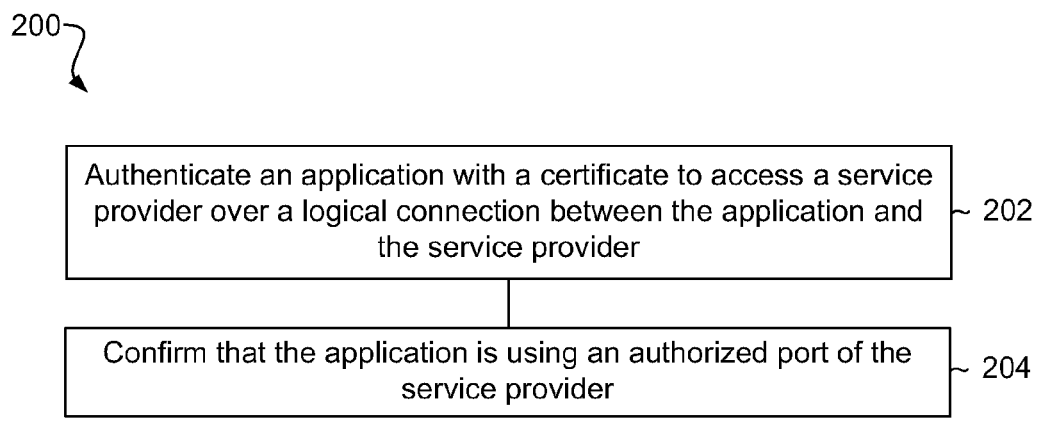
FIG. 2 is a diagram of an example of a method for authenticating applications to access service providers according to the principles described herein.

FIG. 2 is a diagram of an example of a method (200) for authorizing applications to access service providers according to the principles described herein. In this example, the method (200) includes authenticating (202) an application with a certificate to access a service provider over a logical connection between the application and the service provider and confirming (204) that the application is using an authorized port of the service provider.

The method may further include confirming that packets sent from the application have a key generated by authentication process. The key will be extracted from the packet before processing in the service provider, where the key is analyzed to determine whether the key is valid. If the key is valid, the packet will be processed, however, if the key is not valid, the packet will not be processed. In some examples, the key has a time expiration when the service provider generates a new key. Both service provider and application updates these keys periodically. In some examples, the key is uniform for each application that is authorized to communicate with the service provider. In other examples, the key is specific to an application, specific to a port, specific to another feature, or combinations thereof.

To receive a certificate the application sends a request to the service provider, who in turn sends seeks approval of a network administrator. If permission is granted from the network administrator, a certificate signing engine generates a certificate that is sent to the application.

Confirming that the application is using an authorized port can include consulting with a port authorization table that tracks which ports can be used by which applications. In some examples, the certificate indicates which of multiple ports belonging to the service provider that the application is authorized to use.

Figure 3:
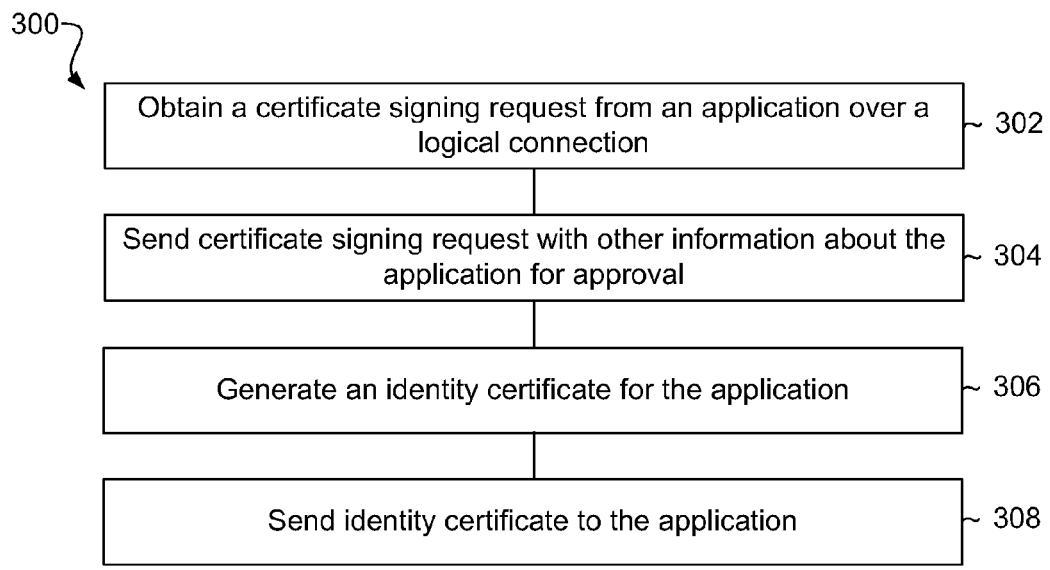
FIG. 3 is a diagram of an example of a method for obtaining a certificate according to the principles described herein.

FIG. 3 is a diagram of an example of a method (300) for obtaining an identity certificate according to the principles described herein. In this example, the method (300) includes obtaining (302) a certificate signing request from an application over a logical connection, sending (304) the certificate signing request with other information about the application to a network administrator for approval, generating (306) the identity certificate for the application, and sending (308) the identity certificate to the application along with keys for a later authentication process.

In some examples, the service provider is aware of the application, and initiates the authentication process by sending an invitation to begin the process. In other examples, the application initiates the process. The additional information about the application is included in a packet that also contains the certificate signing request or the additional information is included in a separate packet.

Figure 4:
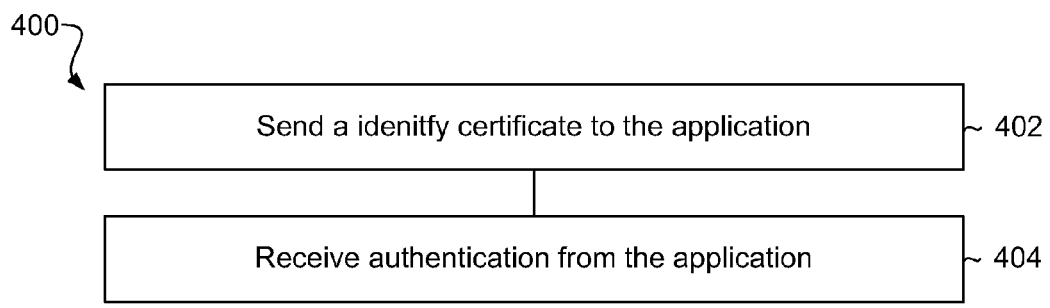
FIG. 4 is a diagram of an example of a method of authenticating the service provider to the application according to the principles described herein.

FIG. 4 is a diagram of an example of a method (400) of authenticating the service provider to the application according to the principles described herein. In this example, the method (400) includes sending (402) an identity certificate to the application and receiving (404) authentication from the application.

Figure 5:
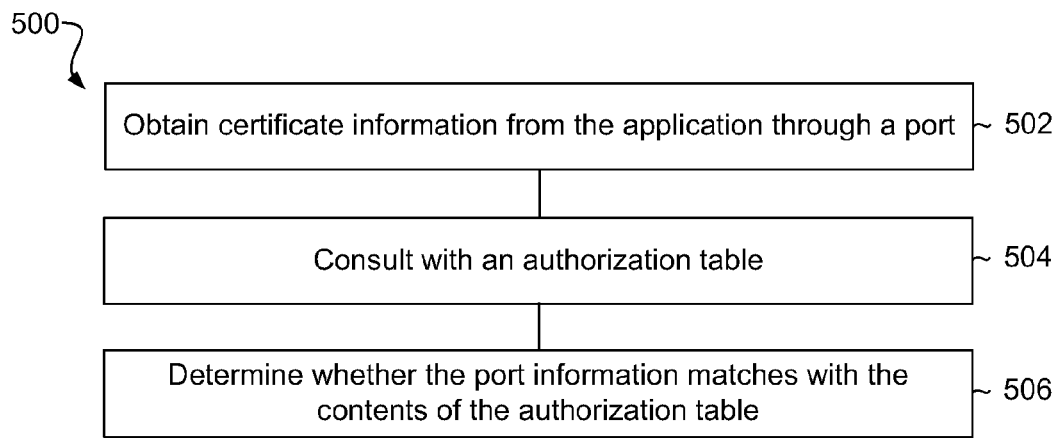
FIG. 5 is a diagram of an example of a method of authorizing a port with the service provider according to the principles described herein.

FIG. 5 is a diagram of an example of a method (500) of authenticating a port with the service provider according to the principles described herein. In this example, the method (500) includes obtaining (502) a certificate from the application through a port, consulting (504) with an authorization table, and determining (506) whether the port information matches with the contents of the authorization table.

Figure 6:
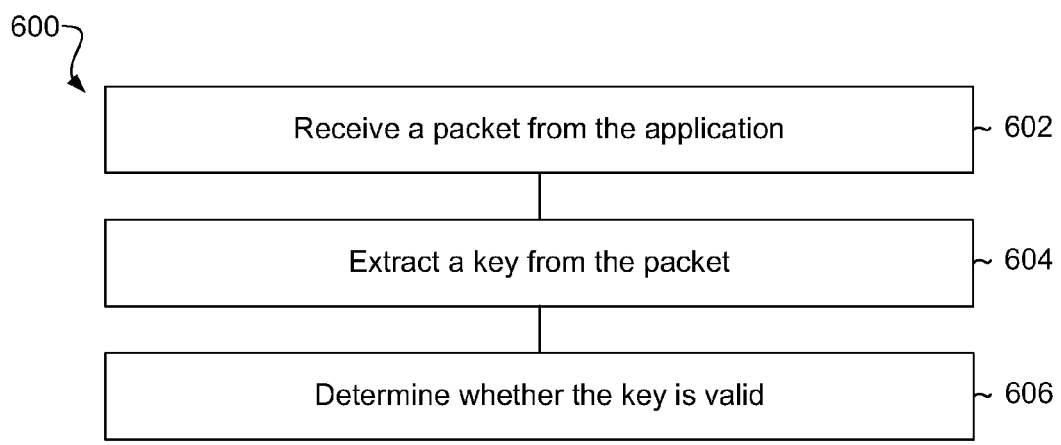
FIG. 6 is a diagram of an example of a method for validating a packet from the application according to the principles described herein.

The certificate information sent from the application may be acquired by the application during an earlier pre-authentication process. The service provider consults with a port authorization table to see whether the port through which the application is communicating is the authorized port for communication between the application and the service provider. The service provider tracks the changes to the port authorization table or at least has access to the table stored at a remote location. If the port being used by the application does not match that which is indicated in the port authorization table, the communication fails FIG. 6 is a diagram of an example of a method (600) for validating a packet from the application according to the principles described herein. In this example, the method (600) includes receiving (602) a packet from the application, extracting (604) a key from the packet, and determining (606) the key is valid.

The key may become outdated over time. In such a situation, the service provider or another device will send an updated key to the application to use in future communication with the service provider. The key is a sequence of binary values that are incorporated into a header or body of a packet.

Figure 7:
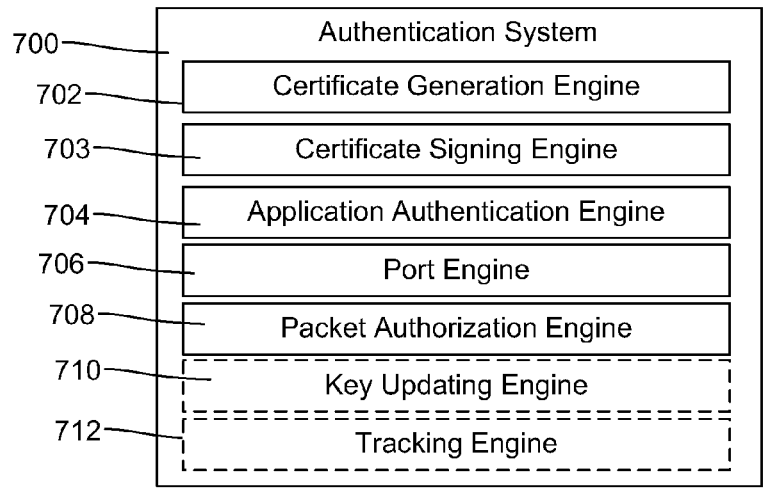
FIG. 7 is a diagram of an example of an authentication system according to the principles described herein.

FIG. 7 is a diagram of an example of an authentication system (700) according to the principles described herein. The authentication system (700) includes a certificate generation engine (702) at the application side, a certificate signing engine (703) at the service provider side, an application authentication engine (704), a port authorization engine (706), and a packet authorization engine (708). In some examples, the authentication system (700) additionally includes a key updating engine (710), and a tracking engine (712). The engines (702, 703, 704, 706, 708, 710, 712) refer to a combination of hardware and program instructions to perform a designated function. Each of the engines (702, 703, 704, 706, 708, 710, 712) may include a processor and memory. The program instructions are stored in the memory and cause the processor to execute the designated function of the engine.

The certificate generating engine (702) generates a certificate for the application requesting certificate if the network administrator approves. The certificate signing engine (703) signs the engine in response to receiving approval from the network administrator. The application authentication engine (704) authenticates the service provider to the application. The port confirmation engine (706) ensures that the application is using the correct port to communicate with the service provider. Also, the packet authorization engine (708) ensures that the packets that appear to be sent from the application are indeed valid packets that were sent from the indicated source. The packet authorization engine (708) extracts certificate keys issued from the service provider when the certificate was generated or updated at later time by the service provider from the packets sent from the application.

Also, a key updating engine (710) is used to update the certificate keys as the keys become outdated. The key updating engine (710) generates the updates to the keys and sends the updated keys to the approved applications. Further, a tracking engine (712) tracks the identifiers of each approved application and their authorized ports for communicating with the service provider. The tracking engine (712) may use a port authorization table to track the ports and identifiers.

Figure 8:
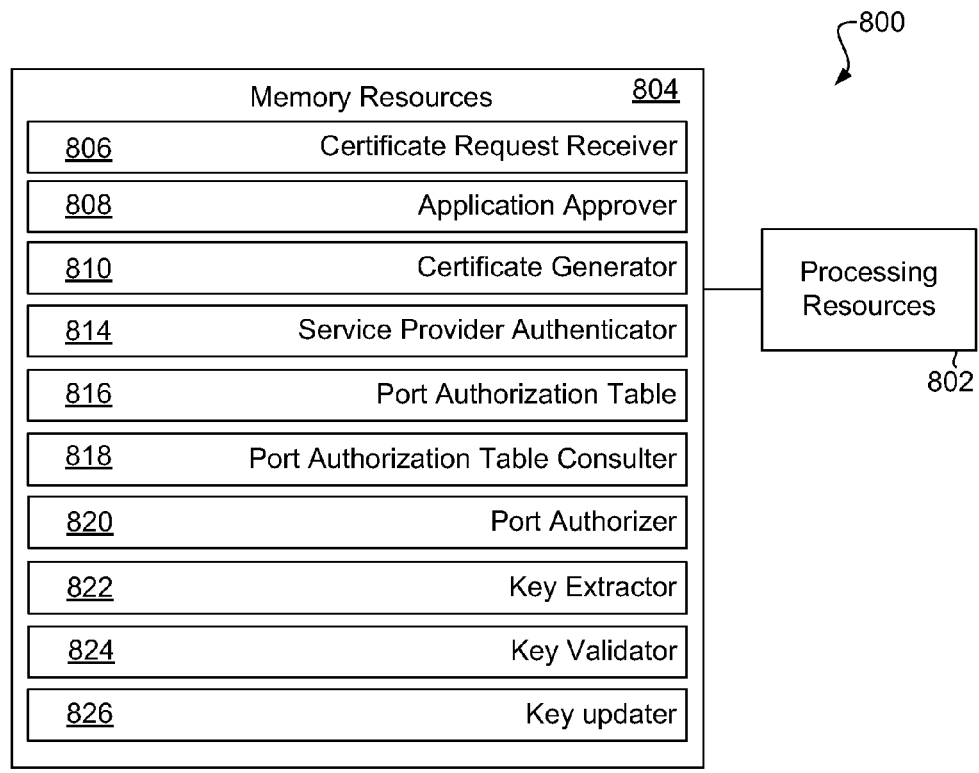
FIG. 8 is a diagram of an example of an authentication system according to the principles described herein.

FIG. 8 is a diagram of an example of an authorization system (800) according to the principles described herein. In this example, the authorization system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the authorization system (800). The programmed instructions shown stored in the memory resources (804) include a certificate request receiver (806), an application approver (808), a certificate generator (810), a service provider authenticator (814), a port authorization table consulter (818), a port authorizer (820), a key extractor (822), a key validator (824), and a key updater (826). The data structures shown stored in the memory resources (804) include a port authorization table (816).

The memory resources (804) include a computer readable storage medium that contains computer readable program code to cause tasks to be executed by the processing resources (802). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The certificate request receiver (806) represents programmed instructions that, when executed, cause the processing resources (802) to receive requests for certificates to use the services of the service provider. The application approver (808) represents programmed instructions that, when executed, cause the processing resources (802) to approve the application to receive a certificate. The certificate may be specific to the application or to the type of application. In other examples, the certificate is a general certificate common to all applications that are approved by the application approver (808). In some examples, the application approver (808) relies on input from a human source, such as a network administrator, to approve the application. In other examples, the application approver (808) follows a set of rules from an approval policy.

The certificate generator (810) represents programmed instructions that, when executed, cause the processing resources (802) to generator a certificate for the application in response to approval from the application approver (808). The service provider (814) represents programmed instructions that, when executed, cause the processing resources (802) to authenticate the service provider to the application in response to receiving a certificate from service provider.

The port authorization table consulter (818) represents programmed instructions that, when executed, cause the processing resources (802) to consults with the port authorization table (816) to determine whether the port that the application is using is the authorized port for the application to use with the service provider. The port authorizer (820) represents programmed instructions that, when executed, cause the processing resources (802) to authorize the port used by the application if the port matches what the port authorization table indicates is the correct port.

The key extractor (822) represents programmed instructions that, when executed, cause the processing resources (802) to extract a key from packets that are sent to the service provider from the application. The key validator (824) represents programmed instructions that, when executed, cause the processing resources (802) to validate the key extracted from the packet if the key is a valid key. The key updater (816) represents programmed instructions that, when executed, cause the processing resources (802) to update the key if the key becomes outdated by sending the updated version of the key to the application.

Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (804) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries and may be accessed from a remote location over a network connection while the programmed instructions are located locally. Thus, the authorization system (800) may be implemented on a user device, on a server, on a collection of servers, or combinations thereof.

The authentication system (800) of FIG. 8 may be part of a general purpose computer. However, in alternative examples, the authentication system (800) is part of an application specific integrated circuit.

Figure 9:
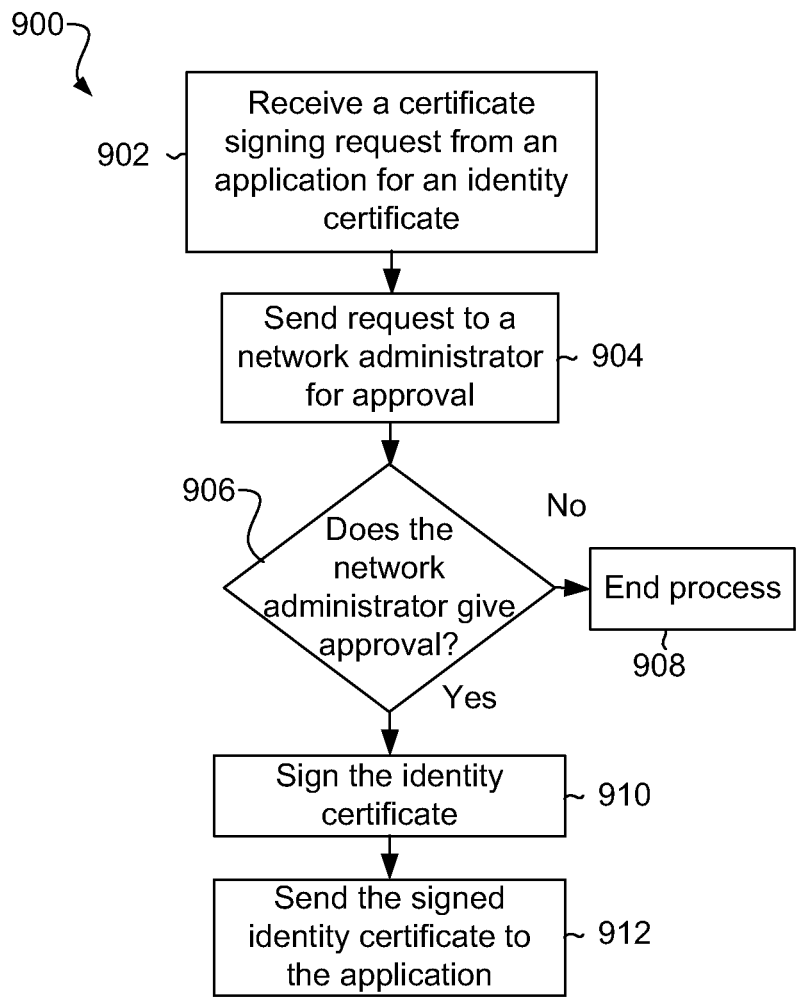
FIG. 9 is a diagram of an example of a flowchart of a process for generating a certificate according to the principles described herein.

FIG. 9 is a diagram of an example of a flowchart of a process for generating a certificate according to the principles described herein. In this example, the process includes receiving (902) a certificate signing request from an application for a certificate and sending (904) the request to a network administrator for approval. The process includes determining (906) whether the network administrator grants approval. If not, the process ends (908).

Figure 10:
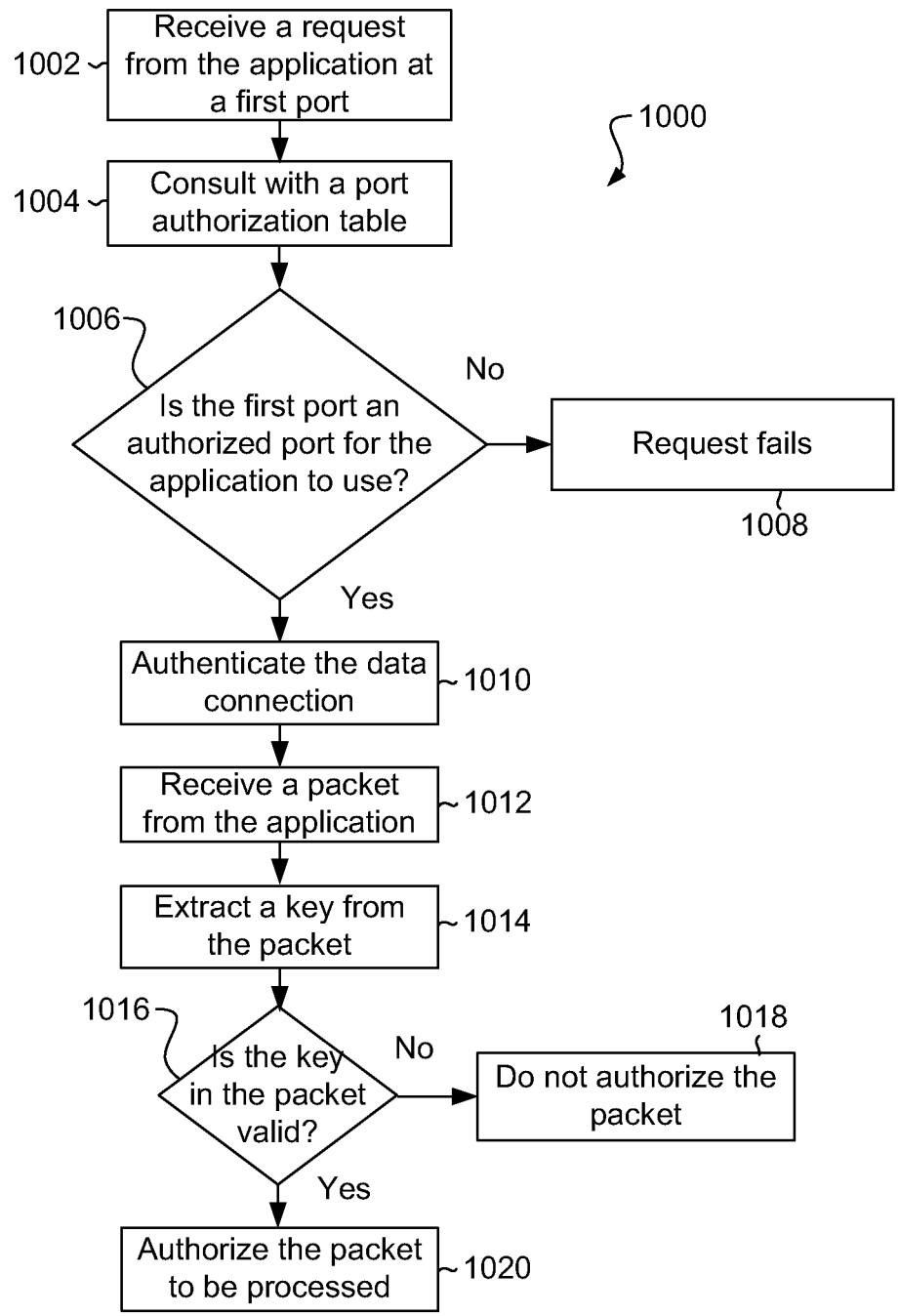
FIG. 10 is a diagram of an example of a flowchart of a process for authenticating an application to communicate with a service provider according to the principles described herein.

If the network administrator approves, an identity certificate is signed (910) and the signed identity certificate is sent (912) to the application. In response to receiving the certificate, the application stores the certificate FIG. 10 is a diagram of an example of a flowchart (1000) of a process for authenticating an application to communicate with a service provider according to the principles described herein. In this example the process includes receiving (1002) a request from the application at a first port of the service provider. The service provider consults (1004) with an authorization table and determines (1006) whether the first port is an authorized for the application to use. If the first port is not authorized for the application to use, the request fails (1008). If the application is authorized to use the first port, then the process includes authenticating (1010) the data connection between the service provider and the application.

The process also includes the service provider receiving (1012) another packet from the application. A key embedded in the packet is extracted (1014), and the process includes determining (1016) whether the key is valid. If the key is not valid, the packet is not authorized (1018) for processing. If the key is valid, the packet is authorized (1020) for processing.

While the examples above have been described with reference to specific networks, network components, service providers, and applications, any appropriate network, network component, service provider, and application may be used in accordance with the principles described herein. The application and the service provider may communicate with each other directly or indirectly through other network components. Further, the network may be a wireless network, and the application and the service provider may communicate with each other over a wireless access point. To ensure security during the authorization process, the logical connection between the application and the service provider is encrypted.

Further, while the examples above have been described with reference to specific protocols, types of logical connections, and sequences of exchanges between the application and the service provider, any protocol, type of logical connection, or sequence of exchanges may be used in accordance with the principles contained herein. Also, while the examples above have been described with reference to specific mechanisms for approving an application to receive a certificate, any appropriate mechanism for approving an application may be used in accordance with the principles described herein. Further, while the examples above have been described with reference to specific ways to authenticate the service provider, any appropriate mechanism for authenticating the service provider may be used. While the examples above have been described with specific reference to mechanisms for approving ports and packets, any appropriate mechanism for approving ports and/or packets may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A multi-layered security method, comprising:
receiving, by a service provider comprising a processor from an application, a certificate at a port of the service provider;
authenticating, by the service provider, the application with the certificate to access the service provider over a logical connection between the application and the service provider;
confirming, by the service provider, that the port at which the certificate was received from the application is an authorized port of the service provider for the application; and
after the authenticating and the confirming, validating, by the service provider, that each respective packet of a plurality of packets sent from the application comprises a key from the service provider.

2. The multi-layered security method of claim 1, wherein the key has a time expiration.

3. The multi-layered security method of claim 2, further comprising:
in response to the time expiration of the key, sending, by the service provider to the application, an updated key;
receiving, by the service provider from the application, a further packet containing the updated key; and
validating, by the service provider, the further packet using the updated key.

4. The multi-layered security method of claim 1, further comprising receiving a request from the application to obtain the certificate from the service provider.

5. The multi-layered security method of claim 4, further comprising generating the certificate for the application in response to gaining approval from a network administrator.

6. The multi-layered security method of claim 1, wherein the application is authorized to use a subset of ports belonging to the service provider.

7. The multi-layered security method of claim 1, wherein the logical connection is encrypted.

8. The multi-layered security method of claim 1, further comprising maintaining a table comprising the information, the table specifying which of multiple ports belonging to the service provider are authorized for use by the application, wherein the confirming that the port at which the certificate was received from the application is an authorized port is based on determining that the port at which the certificate was received from the application is specified in the table as authorized for use by the application.

9. A switch comprising:
a processor; and
a non-transitory storage medium storing instructions executable on the processor to:
generate a certificate for an application authorized to use the switch;
receive, from the application, the certificate at a port of the switch;
authenticate the application using the certificate received from the application;
confirm that the port at which the certificate was received from the application is an authorized port of the switch for the application by accessing information that identifies the authorized port for the application; and
after the authenticating and the confirming, validate each respective packet of a plurality of packets received by the switch from the application, by determining that the respective packet contains a valid key so as to provide per-packet authorization to protect the switch.

10. The switch of claim 9, wherein the instructions are executable on the processor to seek approval from a network administrator before generating the certificate.

11. The switch of claim 9, wherein the instructions are executable on the processor to, in response to expiration of the key, send an updated key to the application.

12. The switch of claim 9, wherein the instructions are executable on the processor to:
decline to process the respective packet, in response to the validating indicating that the key contained in the respective packet is invalid; and
process the respective packet to provide a service of the switch to the application, in response to the validating indicating that the key contained in the respective packet is valid.

13. A non-transitory computer readable storage medium comprising program instructions that, when executed, cause a service provider to:
receive, from an application, a certificate at a port of the service provider;
authenticate, using the certificate, the application to access the service provider over a logical connection between the application and the service provider;
confirm that the port at which the certificate was received from the application is an authorized port of the service provider for the application by accessing information that identifies the authorized port for the application; and
after the authenticating and the confirming, validate that each respective packet of a plurality of packets sent from the application comprises a valid key from the certificate issued to the application for accessing the service provider.

14. The non-transitory computer readable storage medium of claim 13,
wherein the program instructions, when executed, cause the service provider to:
in response to expiration of the key, send an updated key to the application;
receive, from the application, a further packet containing the updated key; and
validate the further packet using the updated key.

15. The switch of claim 12, further comprising a storage to store a port authentication table comprising the information, the port authentication table listing which port the application is authorized to use for communication with the switch, wherein the confirming that the port at which the certificate was received from the application is an authorized port is based on determining that the port at which the certificate was received from the application is specified in the port authorization table as authorized for use by the application.

16. The switch of claim 9, wherein the key has an expiration time after which the key is no longer valid.

17. The non-transitory computer readable storage medium of claim 13, wherein the key has an expiration time after which the key is no longer valid.

18. The method of claim 1, further comprising:
declining, by the service provider, to process the respective packet, in response to the validating indicating that the key contained in the respective packet is invalid; and
processing, by the service provider, the respective packet to provide a service of the service provider to the application, in response to the validating indicating that the key contained in the respective packet is valid.

19. The non-transitory computer readable storage medium of claim 13, wherein the program instructions when executed cause the service provider to:
decline to process the respective packet, in response to the validating indicating that the key contained in the respective packet is invalid; and
process the respective packet to provide a service to the application, in response to the validating indicating that the key contained in the respective packet is valid.

* * * * *